(12) United States Patent
Kontio et al.

(10) Patent No.: US 6,487,410 B1
(45) Date of Patent: Nov. 26, 2002

(54) CONNECTING A MULTIMODE TERMINAL TO THE NETWORK IN A MOBILE COMMUNICATION SYSTEM

(75) Inventors: Ari Kontio, Espoo (FI); Juha Korhonen, Cambridge (GB)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/421,057

(22) Filed: Oct. 19, 1999

Related U.S. Application Data (63) Continuation of application No. PCT/FI98/00344, filed on Apr. 17, 1998.

(30) Foreign Application Priority Data

Apr. 22, 1997 (FI) .................................................. 971717

(51) Int. Cl.$^7$ .............................................. H04M 1/72
(52) U.S. Cl. ...................... 455/437; 455/426; 455/436; 455/438; 455/552; 455/553
(58) Field of Search ................. 455/436, 437, 455/444, 552, 553, 442, 464, 467, 426

(56) References Cited

U.S. PATENT DOCUMENTS

| | | | |
|---|---|---|---|
| 5,260,988 A | * 11/1993 | Schellinger et al. | 455/464 |
| 5,659,598 A | * 8/1997 | Byrne et al. | 455/426 |
| 5,737,703 A | * 4/1998 | Byrne | 455/436 |
| 5,930,712 A | * 7/1999 | Byrne et al. | 455/426 |
| 6,201,966 B1 | * 3/2001 | Rinne et al. | 455/434 |
| 6,327,470 B1 | * 12/2001 | Ostling | 455/426 |

FOREIGN PATENT DOCUMENTS

| | | |
|---|---|---|
| EP | 0677940 | 10/1995 |
| GB | 2282730 | 4/1995 |
| WO | WO 9625015 | 8/1996 |
| WO | WO 9706648 | 2/1997 |

* cited by examiner

Primary Examiner—Dwayne Bost
Assistant Examiner—Ahmed Lahjouji
(74) Attorney, Agent, or Firm—Altera Law Group, LLC (57) ABSTRACT

The invention relates to a handover method and a method for selecting a base station for connecting a multimode terminal (PP/MS) in a mobile communication system which consists of at least one first base station (BTS) and at least one second base station (FRP) controlled by a MSC, and multimode terminal (PP/MS). The handover method comprises recognizing the poor radio connection between the serving second base station (RFP) and the multimode terminal (PP/MS), selecting one of the first base station (BTS) as the target cell for handover on the basis of the measurements carried out in the multimode terminal (PP/MS), and performing the handover. It is characteristic of the handover method according to the invention that a cell description is transmitted to the multimode terminal (PP/MS) via the second base station (RFP), the cell description including information about the frequency of at least one first base station (BTS), and measuring base station signal in the multimode terminal (PP/MS) at said frequencies, when the ongoing radio connection has been recognized to be poor.

12 Claims, 6 Drawing Sheets

CONNECTING A MULTIMODE TERMINAL TO THE NETWORK IN A MOBILE COMMUNICATION SYSTEM

This is a continuation of PCT/FI98/00344 filed Apr. 17, 1998.

FIELD OF THE INVENTION

The invention relates to the handover method and a method for the selection of the base station for connection of a multimode terminal in a mobile communication system which consists of an MSC (Mobile Services Switching Center), at least one first base station and at least one second base station controlled by the MSC, and multimode terminals which consist of a first part for establishing a radio connection with the first base station and a second part for establishing a radio connection with the second base station.

The invention also relates to the multimode terminal.

BACKGROUND OF THE INVENTION

Figure 1A:
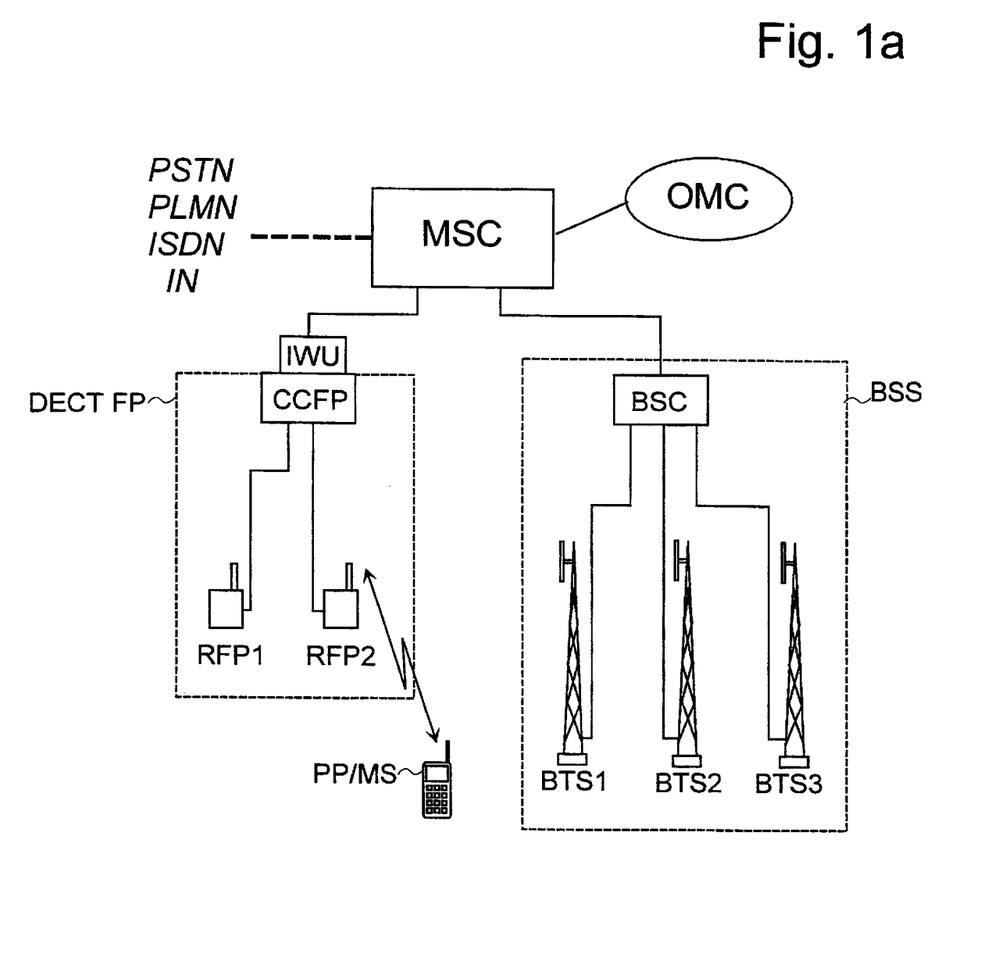
FIG. 1a shows the parts of the mobile communication network that are essential for the invention.

FIG. 1a, attached, shows the block diagram of a mobile communication system the exchange of which controls the BSSs (Base Station Sub-systems) of the digital cordless telephone system DECT (Digital Enhanced Cordless Telecommunications) and the GSM (Global System for Mobile communications) mobile communication system. The MSC (Mobile Services Switching Centre) usually controls several base station systems BSS/FP. The MSC is connected to other MSCs and to other networks, such as the PSTN (Public Switched Telephone Network), PLMN (another mobile communication network), ISDN network, or IN (Intelligent Network). A multimode terminal that operates in several radio systems makes it possible to use several different radio systems for telecommunications traffic. The dualmode terminal PP/MS shown in FIG. 1a operates both as a cordless telephone of the DECT system (PP, Portable Part) and as an MS (Mobile Station) of the GSM system. The cordless telephone part of the dualmode terminal, PP, is connected in the DECT system to a DECT base station RFP (Radio Fixed Part), as shown in FIG. 1a, to the DECT base station RFP2. The fixed part of the base station system of the DECT system DECT FP (Fixed Part) consists of the base station controller CCFP (Common Control Fixed Part) which controls one or more DECT base stations RFP. The fixed part of the DECT system DECT FP is connected to the MSC via an adapter part IWU (Interworking Unit). The adapter part IWU performs, among other things, the necessary protocol conversions. In the GSM system the mobile station part MS of the dualmode terminal PP/MS is connected via radio path to a BTS (Base Transceiver Station). The BSS (Base Station System) consists of a BSC (Base Station Controller) and the base stations BTS controlled by it. The operation of the entire system is monitored by the OMC (Operation and Maintenance Centre).

Figure 1B:
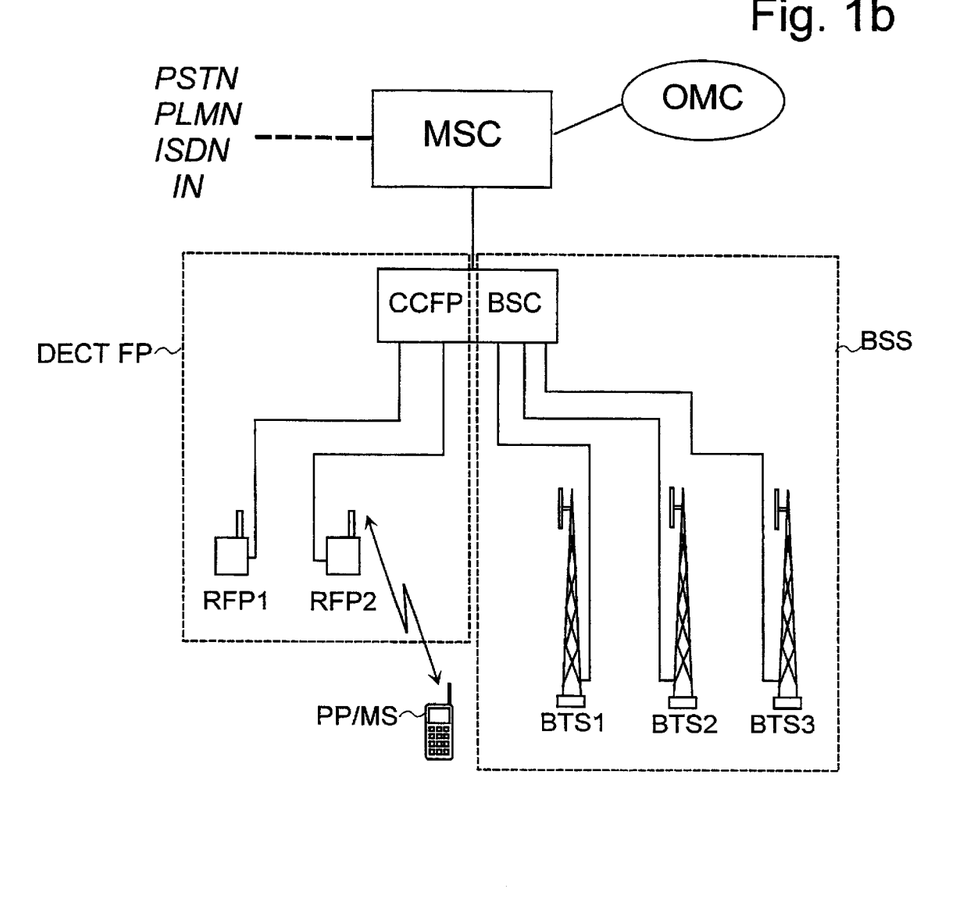
FIG. 1b shows the parts of the mobile communication network that are essential for the invention in case of an integrated base station controller.

In the DECT/GSM system it is also known that the functionality of the base station controller BSC and that of the DECT base station controller CCFP are connected into a single, so-called dualmode base station controller, as shown in FIG. 1b. This kind of a dualmode base station controller BSC/CCFP also includes the adapter part IWU. Otherwise the block diagram of FIG. 1b corresponds with FIG. 1a described above.

Figure 2:
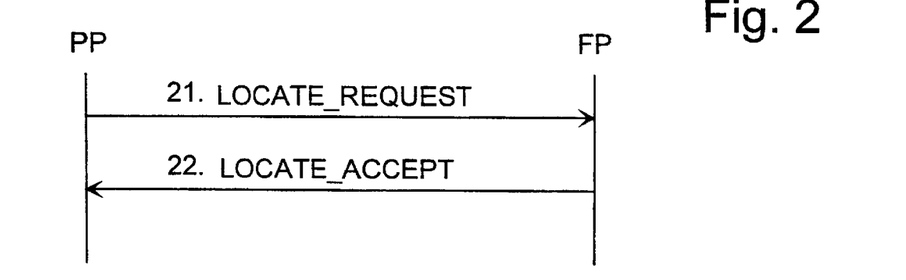
FIG. 2 shows the location update of the DECT system as a signaling chart.

For use in call setup terminating in the terminal the registers of the cordless telephone system/mobile communication system contain the information about the geographic location of the terminal. In the GSM mobile communication system and the DECT cordless telephone system the coverage area of the network is divided into location areas which consist of the coverage areas of one or more base stations. The location of the terminal is defined by using these location areas. When the terminal has moved from one location area to another the terminal performs a location update to notify the network about its new location area. FIG. 2 shows the location update signalling for the DECT system. The cordless telephone PP sends the location update request to the base station to which it is listening by using the LOCATE REQUEST (message 21) to which is attached the identifier of the new location area. The fixed part of the network FP acknowledges the location update by using the LOCATE_ACCEPT (message 22), when the location area in the network register has been replaced with the stated new location area.

Figure 3A:
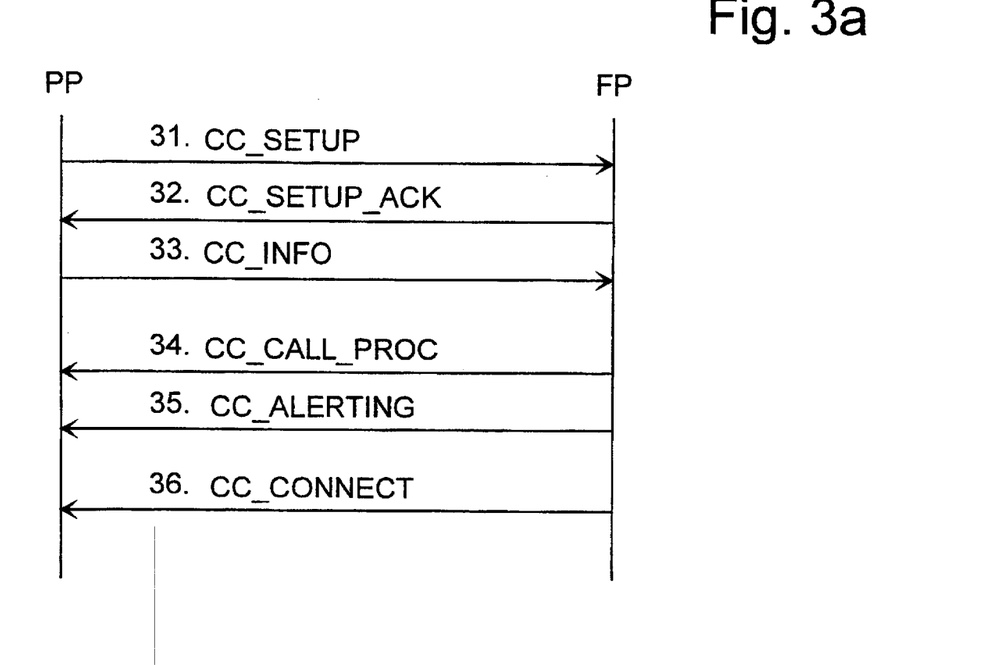
FIG. 3a shows the call setup originating in the cordless terminal in the DECT system as a signaling chart.

FIG. 3a attached, shows the call setup originating in the terminal PP in the DECT network. When the cordless telephone PP wants to make a call, it sends the CC_SETUP (message 31) to the base station RFP of the fixed part FP, which the network acknowledges by sending the CC_SETUP_ACK (message 32). If the cordless telephone PP has not indicated the number of the called subscriber to the network in the CC_SETUP (message 31), the telephone PP is requested for it in the CC_SETUP_ACK (message 32), in which case the terminal PP sends the number requested by using the CC_INFO (message 33). If the number of the called subscriber was indicated in the CC_SETUP (message 31), messages 32 and 33 are not sent at all. The traffic connection is established by using the CC_CALL_PROC (message 34). The CC_ALERTING (message 35) is used to send the line alert tone to the terminal PP. After this the call is continued in the normal fashion.

Figure 3B:
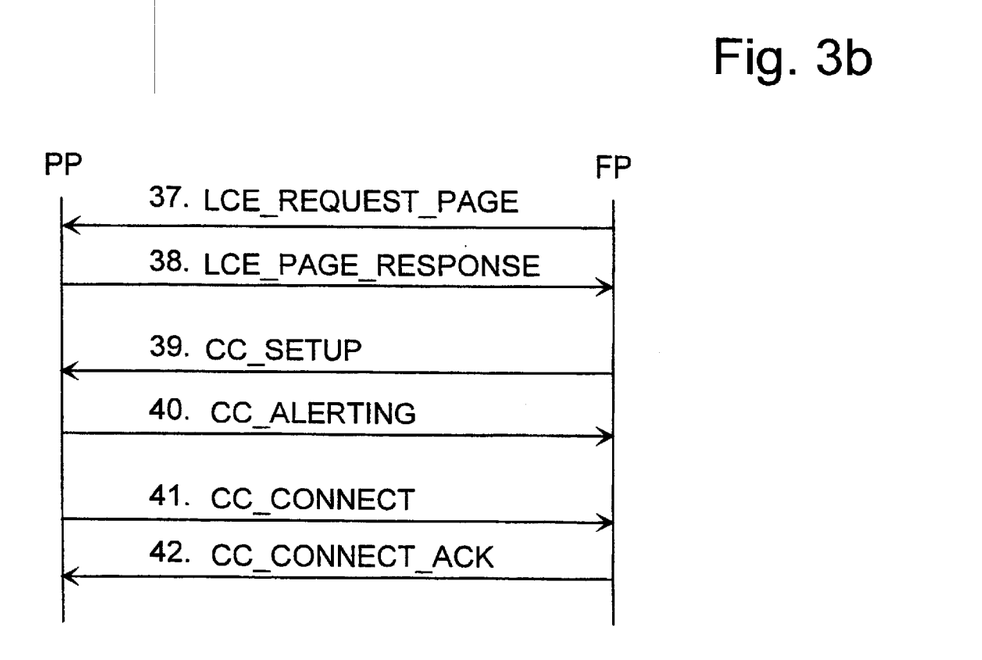
FIG. 3b shows the call setup terminating in the cordless terminal in the DECT system as a signaling chart

FIG. 3b attached, shows the call setup terminating in the terminal PP in the DECT network. The fixed part FP of the DECT network sends the call message LCE_REQUEST_PAGE (message 37) to reach the terminal PP. The cordless telephone PP answers this call by sending the LCE_PAGE_RESPONSE (message 38) after which the network notifies the terminal PP about the incoming call by sending the CC_SETUP (message 39). During the CC_ALERTING (message 40) the network is being sent the line alert tone, and after the subscriber has answered the terminal, the CC_CONNECT (message 41) is sent to establish the connection which the network acknowledges by sending the CC_CONNECT_ACK (message 42).

During the call, it may be necessary to hand over the radio connection between the terminal and base station from one radio channel to another, for example, because of a poor radio signal. Usually such a handover is performed from the serving base station to the radio channel of another base station. In cordless telephone systems, such as the DECT system, the handover process originates usually in the cordless terminal PP which measures the base station signals over the entire usable frequency band and selects a base station with a suitable radio signal as the target cell for the handover. In mobile communication systems, such as the GSM system, the handover originates usually in the side of the fixed network, for example, in the base station controller BSC.

Figure 4:
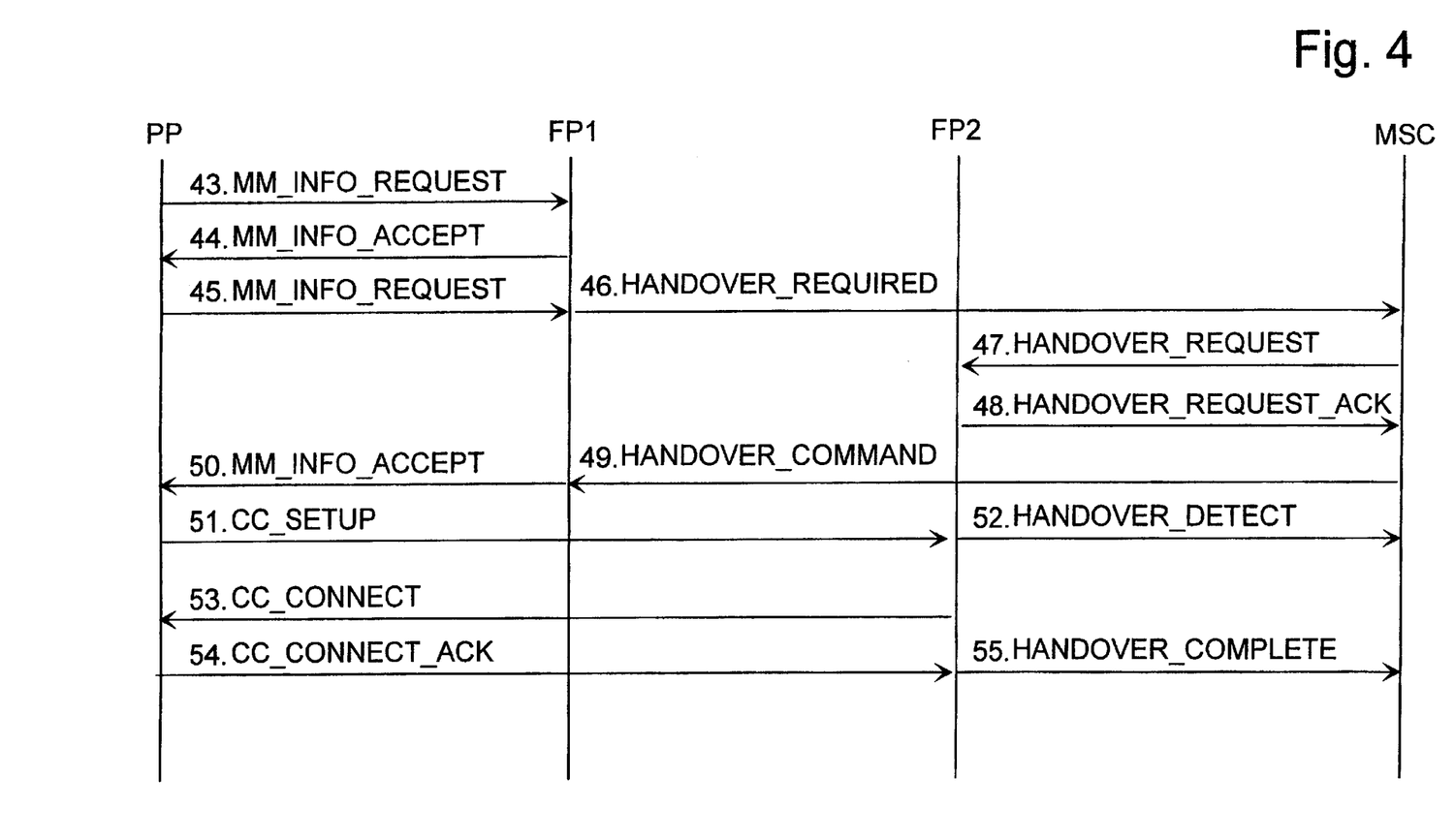
FIG. 4 shows the handover in the DECT system as a signaling chart.

FIG. 4 attached, shows a signaling diagram for the handover between two base station systems FP in the DECT system. Before starting the actual handover process, the terminal PP must receive the data about the possible target cells for the handover from the network. If the terminal PP has not received this data earlier, for example, during the call, the PP requests the data from the network by using the MM_INFO_REQUEST (message 43). The network transmits to the terminal PP via the serving base station, as shown in FIGS. 1a and 1b via the base station RFP2, in the MM_INFO_ACCEPT (message 44) the identifiers of those fixed parts FP into which the handover from the serving base station is possible. The terminal PP continuously measures the quality of the base station signal for these handover target cells and compares the measurement results to one another and to the quality of the signal of the serving base station RFP2. When the terminal PP detects that the signal quality of some other base station is better than the signal quality of the serving base station, it usually initiates the handover process. The terminal PP informs the serving base station system FP1 in the MM_INFO_REQUEST (message 45) about the initiation of the handover and about the target cell selected for the handover. When FP1 receives this information, it sends the HANDOVER_REQlIRED (message 46) to the mobile services switching center MSC, which requests the fixed part FP2 selected as the target cell for the handover to prepare for the handover by using the HANDOVER_REQUEST (message 47). The fixed part FP2 notifies the mobile services switching center MSC about the allocation of the resources of the target cell for the handover by using the HANDOVER_REQUEST ACK (message 48) after the reception of which the MSC notifies the base station system FP1 by using the HANDOVER_COMMAND (message 49) that the handover process can be continued. FP1 transmits this information by using the MM_INFO_ACCEPT (message 50) to the terminal PP, which sends the CC_SETUP (message 51) to the new base station system FP2. The CC_SETUP (message 51) includes the information that the process in question is the handover for an ongoing call instead of a new call setup. The FP2 sends information about the detection of the handover to the MSC by sending the HANDOVER_DETECT (message 52), after which the network connects the ongoing call to this new location. To notify the terminal PP about the acceptance of the handover, the fixed part FP2 sends the CC_CONNECT (message 53) to the terminal PP which the terminal PP acknowledges by sending the CC_CONNECT_ACK (message 54). The mobile services switching center MSC is notified of the success of the handover by using the HANDOVER_COMPLETE (message 55) after which the radio connection is used to convey information about the ciphering to be used in the connection and the former call connection established via the base station RFP2 is disconnected (not shown in the diagram).

The patent application publication GB-2 282 730 presents a handover method in a mobile communication system as shown in FIG. 1a to switch the radio connection of a dualmode terminal PP/MS from the radio channel of a DECT base station to a base station BTS of the GSM system. In the method described in the publication the mobile station part MS of the dualmode terminal continuously measures the signal level received from the base stations BTS of the GSM system and transmits the measurement results thus obtained to the cordless telephone part PP of the dualmode terminal PP/MS. When the radio connection on the cordless telephone side of the system gets so weak that it triggers the handover, the measurement results are transmitted from the cordless telephone PP further via the DECT base station RFP to the mobile services switching center MSC in the handover request. By using the received measurement results the MSC selects the base station BTS of the GSM system suitable for the handover into whose control the call of the dualmode terminal PP/MS is switched by using the handover.

The following problem occurs in the handover method presented in the GB publication. To determine the target cell for a possible handover, the mobile station part MS of the terminal must be continuously switched on to receive the GSM base station signals for measurements. This increases the power consumption of the terminal and thus consumes the limited battery capacity of the terminal thereby shortening the standby/operation time of the terminal.

SUMMARY OF THE INVENTION

The object of this invention is to recognize the base station of a mobile communication system whose radio signal is suitable to a multimode terminal by spending as little of the terminal power as possible, when it is desirable to switch the multimode terminal from a telecommunication system to use the services of a base station of another mobile communication system.

This is achieved by using a handover method according to the invention in a mobile communication system of the type presented in the introduction, the said method comprising the following steps: recognizing the poor radio connection between the serving second base station and the multimode terminal, selecting, as the target cell for the handover, one of the first base stations on the basis of the measurements performed in the multimode terminal, and performing the handover from the serving second base station to the selected first base station. It is characteristic to the handover method according to the invention that it further comprises the steps of: transmitting to the multimode terminal a cell description via the second base station, the said cell description containing the information about the frequency of at least one first base station located in the geographic area of the terminal, and performing a measurement of base station signals in the multimode terminal on frequencies indicated in the cell description, when the ongoing radio connection is detected to be poor.

The invention also relates to a method for selecting the base station for connecting the multimode terminal in a mobile communication system of the type presented in the introduction. It is characteristic for the method according to the invention that it comprises the steps of: transmitting to the multimode terminal via the second base station a cell description which contains the information about the frequency of at least one first base station located in the geographic area of the terminal, and selecting, as the base station to be listened to, one of the first base stations selected in the multimode terminal on the basis of the cell description, when it is desirable to switch to the service of one of the first base stations.

Furthermore, the invention relates to the multimode terminal which is adapted to operate in a mobile communication system, the said system consisting of at least one first base station and at least one second base station. It is characteristic for the multimode terminal according to the invention that it contains the equipment for storing the frequency data of at least one first base station transmitted from the second base station, and the equipment for selecting the base station to be listened to on the basis of the stored frequency data.

The invention is based on the idea that the multimode terminal connected to one telecommunication system is sent data about the frequency/frequencies used in another mobile communication system in the geographic area in question so that the multimode terminal can, if necessary, flexibly switch over from the one telecommunication system to be served by the mobile communication system. The local frequency data is transmitted to the multimode terminal preferably in the normal signaling of the telecommunication system attached to a message sent from the network to the terminal. When it is desirable to switch the multimode terminal to the service of the mobile communication system, the first part MS of the terminal synchronizes to the frequency indicated in the last received frequency data and, if necessary, connects to this base station.

The advantage of the method according to the invention is that the handover from the telecommunication system to the mobile communication system can be performed quickly and flexibly and with minimal power consumption on the part of the multimode terminal.

Another advantage of the method according to the invention is that the mobile station part of the terminal need not search the frequency of the base station signal of the mobile communication system, but it can directly tune itself to the cell broadcast frequency of the base station that broadcasts in the area.

Furthermore, another advantage of the method according to the invention is that the mobile station part of the multimode terminal can be kept in a power saving mode until the need for switching to the service of the mobile communication system is detected.

BRIEF DESCRIPTION OF THE DRAWINGS

The description of the preferred embodiments of the invention will now be made with reference to the attached drawings, in which.

DETAILED DESCRIPTION OF THE INVENTION

The present invention can be applied to any telecommunication system and mobile communication system. Later in this document the invention is described in more detail mostly by using the digital cordless telephone system DECT and the digital GSM mobile communication system as an example. FIGS. 1a and 1b show the simplified structure of the mobile communication network, as described earlier. For a more detailed description of the operation and structure of the GSM system, a reference is made to GSM specifications and to a book "The GSM System for Mobile Communications", M. Mouly & M. Pautet, Palaiseau, France, 1992, ISBN:2-9507190-0-7. For a more detailed description of the DECT system, a reference is made to DECT specifications.

In the following the invention is described in more detail in the light of the primary embodiment of the invention by referring to the Figures described earlier in the description of the prior art and to FIG. 5. According to the present invention, the dualmode terminal PP/MS that listens to the signal of the base station RFP of the DECT system, in FIGS. 1a and 1b to the signal of the DECT base station RFP2, is transmitted information in item 52 of FIG. 5 about the cell broadcast frequency of the base station BTS of the GSM system that broadcasts in the same geographic area, the said frequency being used to send the information needed for synchronization to the said base station. In case of FIGS. 1a and 1b, the terminal PP/MS is transmitted, according to the invention, the information about the cell broadcast frequency of the base station BTS1. This information is preferably sent during the normal signaling of the network. The frequency data according to the invention is sent, for example, as the cell description used in the GSM system. The said cell description is transmitted, among other things, in the handover of the GSM system, according to the prior art, from the network to the mobile station MS in the HANDOVER_COMMAND message. The cell description is base station-specific, and it consists, according to the GSM specifications, from the network colour code NCC (PLMN colour code), the base station colour code BCC and the numbers of the radio frequency channels for the broadcast control channels BCCH. In the system according to the present invention the cell description of the GSM system is transferred, for example, at specific intervals via the mobile services switching center MSC to the DECT system in which the description is stored, for example, in the base station controller CCFP. In case of a dualmode base station controller BSC/CCFP shown in FIG. 1b, the GSM cell description is transmitted internally in the base station controller from the GSM system to the DECT system.

Figure 5:
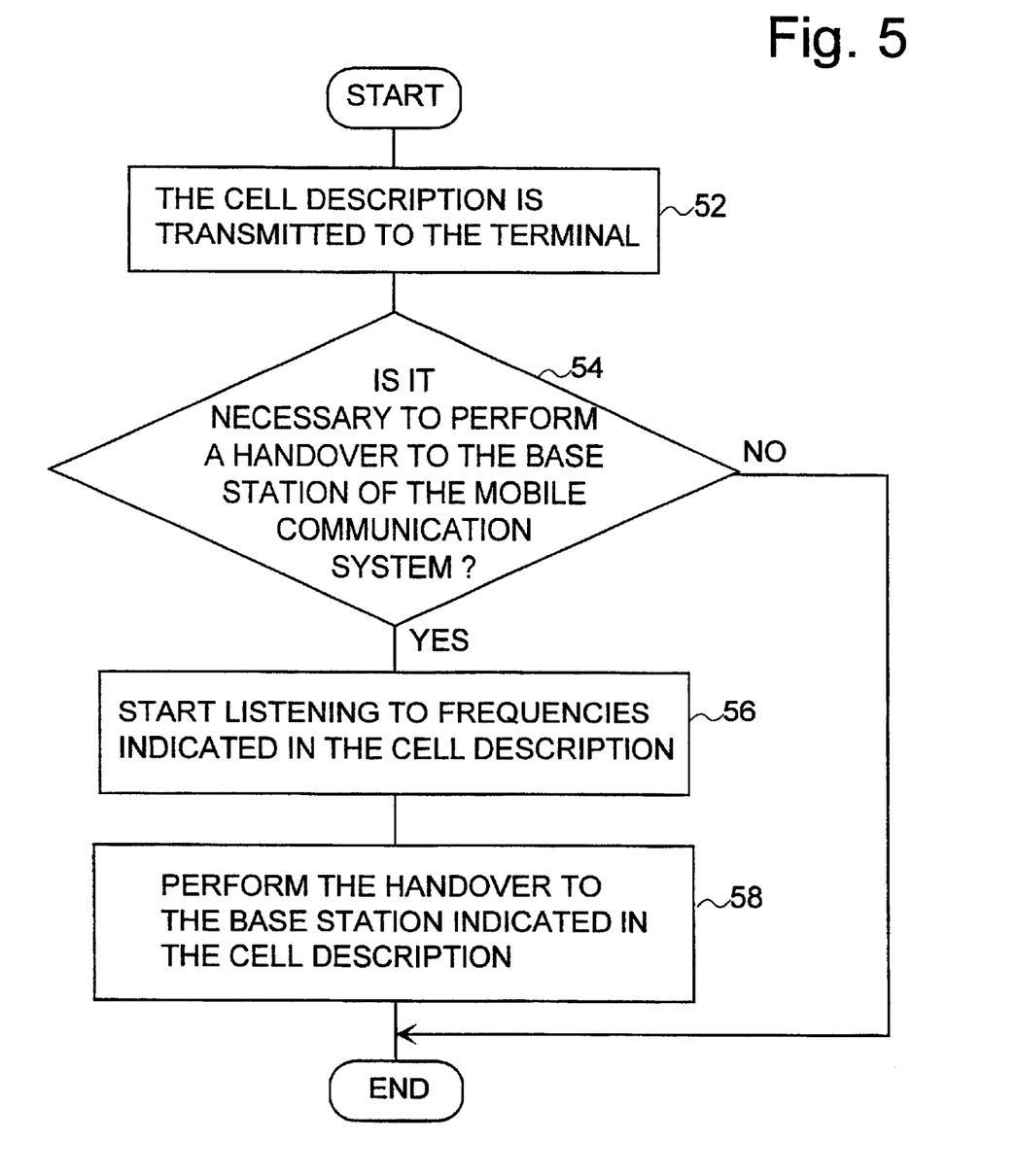
FIG. 5 shows the primary embodiment of the method according to the invention as a flow chart.

The transmission of the cell description according to item 52 in FIG. 5 via radio path from the base station RFP of the fixed part FP of the DECT system to the dualmode terminal PP/MS is carried out preferably in the LOCATE_ACCEPT (message 22) of the location update signalling shown in FIG. 2, and/or in the CC_CONNECT (message 36) in call setup signaling originating in the terminal shown in FIG. 3a, and/or in the CC_SETUP (message 39) in call setup signaling terminating in the terminal shown in FIG. 3b, and/or in the CC_CONNECT (message 53) in handover signaling between the DECT fixed parts FP shown in FIG. 4. It is possible to attach all of the above messages to an IWU-TO-IWU information element in which it is possible to add elements that conform to other protocols, such as the cell description of the GSM system. Thus according to the invention the IWU-TO-IWU is suitable for transmitting the cell description to the terminal PP. The cell description to be attached to location update, call setup, or handover message preferably only includes the frequency of one GSM system, but the invention is also suitable for transmitting several frequencies, for example, in the form of neighboring base station cell descriptions as a BCCH frequency list. Usually the cells of the GSM system are larger than those of the DECT system, so it can be assumed that one GSM frequency will cover the geographic area in which the terminal is located, especially if the location areas defined in the DECT system are small, for example, the size of the coverage area of one base station. The dualmode terminal PP/MS stores the received cell description or the cell description frequency data in its memory. A new received cell description preferably replaces any cell description stored earlier. The new cell description is preferably transmitted to the terminal with each location update. It is assumed that during the time interval between the location updates the terminal is located in the coverage area of the local GSM frequency which was delivered in the location update signaling. To ensure that the cell description is up to date during calls, the cell description is preferably transmitted to the terminal also during call setup and in handovers internal to DECT.

Item 54 in FIG. 5 is for considering whether a handover from the DECT system to the GSM system should be performed for a call originating in the DECT system. If the terminal detects, in its measurements, that the signal quality of the serving DECT base station is poor and the handover to another DECT base station is not sensible because of the low-quality DECT network, the mobile station part MS of the dualmode terminal is switched on, if the MS is, for example, in the power saving mode. The GSM frequency/frequencies stored in the terminal are read from the memory slot and, if necessary, are transmitted from the terminal to the mobile station part MS. The mobile station MS tunes itself on this GSM frequency read from the memory, synchronizes itself to this base station signal, and starts the measurement of this base station signal (FIG. 5, item 56). If there are several frequencies stored in the memory, the mobile station MS performs measurements in all of these frequencies. These measurement results are transmitted to the network by using, for example, the method presented in the patent application publication GB-2 282 730 during handover signaling from the cordless telephone part PP of the dualmode terminal to the DECT network in the MM_INFO_REQUEST message within the IWU-TO-IWU element after which the handover is performed to the most suitable base station BTS of the GSM system on the basis of these measurement results (FIG. 5, item 58).

Figure 6:
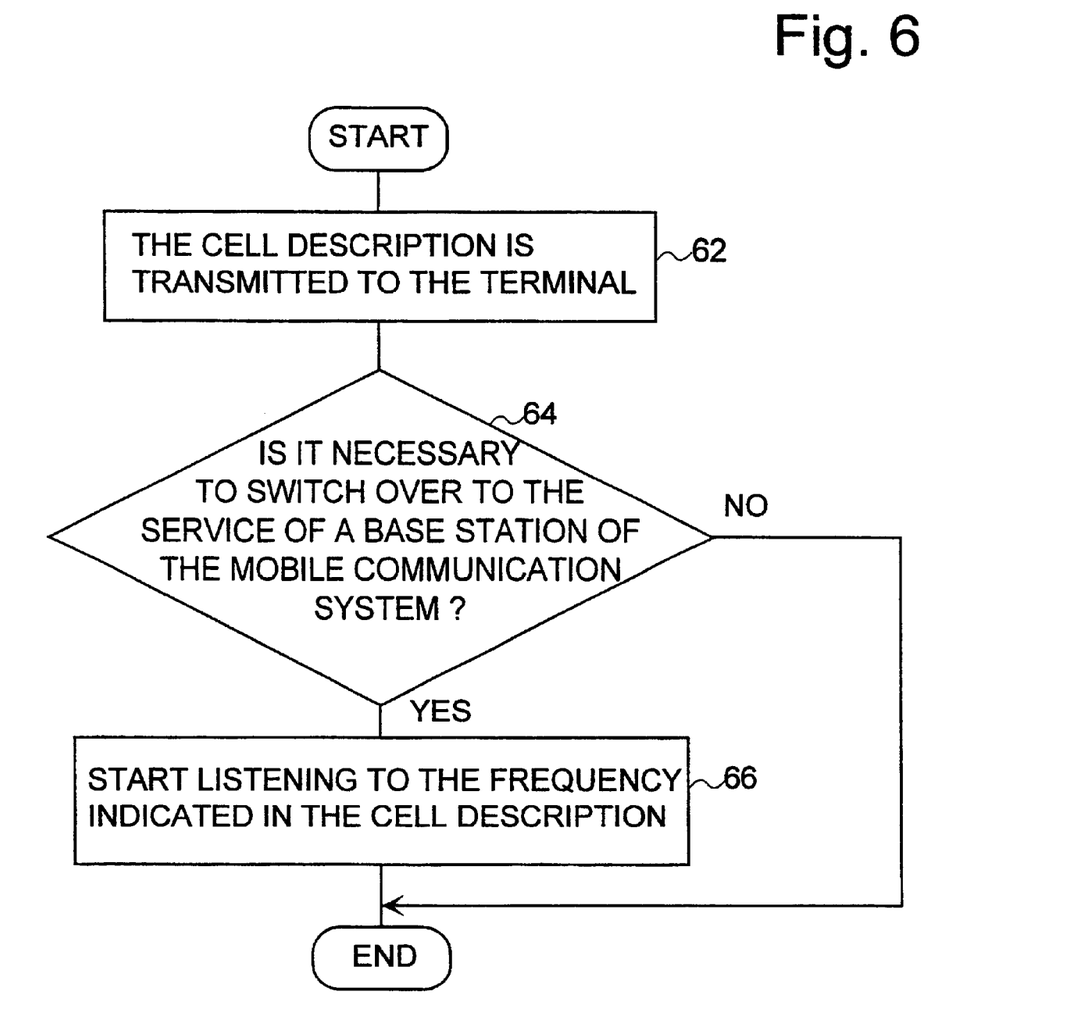
FIG. 6 shows the secondary embodiment of the method according to the invention as a flow chart.

FIG. 6 shows the secondary embodiment of the method according to the invention as a flow chart. In the secondary embodiment of the invention the terminal switches from the cordless telephone system to the mobile communication system while in idle mode or, in other words, when the terminal does not have an ongoing call but it has only switched on to listen to the base station signal. It is preferable to set the terminal to listen to a base station signal that is of a sufficiently high-quality for performing a possible call setup. In item 62 of FIG. 6 the cell description including the local GSM cell broadcast frequency described above in the description of the primary embodiment is transmitted from the network to the dualmode terrninal. The cell description is sent from the GSM network to the DECT network in a manner corresponding to that described above. The cell description is transmitted to the terminal in idle mode preferably during location update in the LOCATE_ACCEPT message (message 22). It is also possible in the secondary embodiment of the invention to send the cell description during the calls of the terminal during call setup signaling in the CC_CONNECT (message 36) and in CC_SETUP (message 39), and during handover signaling in the CC_CONNECT (message 53) as described above in the description of the primary embodiment. The cell description received in the dualmode terminal PP/MS is stored in the memory slot of the terminal and the new cell description is preferably used to replace any cell description received and stored earlier. A terminal in idle mode listens to the DECT base station, until the signal of the DECT network gets too poor. In item 64 of FIG. 6 the terminal monitors, whether it is necessary to switch to listen to the base station BTS of the mobile communication system, for example, to ensure the success of a possible call setup. If the terminal detects the need to switch over to the mobile communication system, it switches on the mobile station part MS of the dualmode terminal and reads the cell description stored in the memory. The mobile station MS is tuned to listen to the cell broadcast frequency of the base station BTS of the GSM system indicated in the cell description (item 66), and the location update/registering in the GSM system is performed.

The subscriber may also want to use the GSM system, even though the DECT network quality were good enough for call setup, for example, because of some special services. The method according to the present invention is also suitable to be used in this situation, as the subscriber can select the desired network from the terminal.

A dual mode terminal that implements the functionality according to the invention, for example, a DECT/GSM dualmode terminal, has been adapted to receive the cell description as a part of the network signaling and to store the said cell description and to use the said cell description in the manner according to the invention. Additionally, this multimode terminal can. be adapted to switch its mobile station part to the power saving mode, when the cordless telephone part of the terminal is in use, and to switch on the mobile station part, when it is desirable to switch over to the mobile communication system. In the manner according to the present invention the multimode terminal has been adapted to read the cell description stored in its memory and to tune itself to the GSM frequencies according to the cell description, when the mobile station part has been turned on for switching to use the mobile communication system.

The drawings and the accompanying explanation are only intended to demonstrate the principles of the invention. The details of the base station selection or handover method according to the invention can vary within the patent claims. Although the invention was described above mostly in the DECT/GSM system, the invention can also be used for other telecommunication systems, such as DECT or PHS (Personal Handy phone System), and for other mobile communication systems, such as GSM, DCS (Digital Cellular System), or PDC (Personal Digital Cellular). The invention is also suitable to be used in combinations of more than two systems, such as DECT/GSM/DCS in which case the cell descriptions of one or both mobile communication systems are transmitted according to the invention to the multimode terminal. It is possible to send as cell description in a method according to the invention instead of the above described base station frequency data, for example, channel data or other data that identifies the base station frequency.

What is claimed is:

1. A handover method in a mobile communication system that consists of a mobile services switching center (MSC), at least one first base station (BTS) and at least one second base station (RFP) controlled by the MSC, and multimode terminals (PP/MS) which. consist of a first part (MS) for establishing a radio connection with a first base station (BTS) and a second part (PP) to establish a radio connection with a second base station (RFP), the said handover method comprising the steps of:

recognizing the poor radio connection between the serving second base station (RFP) and the multimode terminal (PP/MS), selecting, as the target cell for handover, one of the first base stations (BTS) on the basis of measurements performed in the multimode terminal (PP/MS), and performing the handover from the serving second base station (RFP) to the selected first base station (BTS), wherein the said handover method further comprises the steps of:

transmitting to the multimode terminal (PP/MS) a cell description via the second base station (RFP) before initiation of handover from the second base station (RFP) to the first base station (BTS), the cell description containing the information about the frequency of at least one first base station (BTS) located in the geographic area of the terminal, and performing a measurement of base station signals in the multimode terminal (PP/MS) on frequencies indicated in the cell description, when the ongoing radio connection is detected to be poor.

2. A method according to claim 1, wherein the cell description is transmitted to the multimode terminal (PP/MS) attached to a normal signaling message of the network.

3. A method according to claim 1, wherein the multimode terminal (PP/MS) is transmitted cell description which contains the information about the frequency of one first base station (BTS).

4. A method according to claim 1, wherein the cell description received in the multimode terminal (PP/MS) is stored in the memory slot of the terminal.

5. A method according to claim 4, wherein the measurement of the base station signals in the multimode terminal, when the ongoing radio connection has been determined to be poor, comprises the steps of reading the stored cell description from the memory slot of the terminal, switching on the first part (MS) of the multimode terminal, tuning the first part (MS) of the terminal to the frequencies indicated in the cell description read from the memory slot, and measuring the base station signals on the frequencies indicated in the cell description.

6. A method for selecting a base station for idle connecting the multimode terminal (PP/MS) in a mobile communication system which consists of a mobile services switching center (MSC), at least one first base station (BTS) and at least one second base station (RFP) controlled by the MSC, and multimode terminals (PP/MS) which consist of a first part (MS) for establishing a radio connection with the first base stations (BTS) and a second part (PP) for establishing a radio connection with the second base stations (RFP), wherein the method comprises the steps of transmitting to the multimode terminal (PP/MS) via the second base station (RFP) a cell description which contains the information about the frequency of at least one first base station (BTS) located in the geographic area of the terminal, and selecting one of the first base stations (BTS) selected in the multimode terminal (PP/MS) on the basis of the cell description as the base station to which the multimode terminal (PP/MS) listens, when it is desirable to switch over to the service of one of a first base stations.

7. A method according to claim 6, wherein the poor radio signal of the second base station that the multimode terminal (PP/MS) listens to is recognized, the base station signals are measured in the multimode terminal on frequencies indicated in the cell description, when the radio signal of the second base station (RFP) which the multimode terminal (PP/MS) listens to has been recognized to be poor, and one of the first base stations (BTS) is selected as the base station which the multimode terminal (PP/MS) listens to on the basis of the measurements performed in the multimode terminal (PP/MS).

8. A method according to claim 6, wherein the cell description is transmitted to the multimode terminal (PP/MS) attached to a normal signaling message of the network.

9. A method according to claim 6, wherein the multimode terminal (PP/MS) is transmitted a cell description which contains the information about the frequency of one first base station (BTS).

10. A method according to claim 6, wherein the cell description received in the multimode terminal (PP/MS) is stored in the memory slot of the terminal.

11. A method according to claim 10, wherein the measurement of the base station signals in the multimode terminal, when the ongoing radio connection has been determined to be poor, comprises the steps of reading the stored cell description from the memory slot of the terminal, switching on the first part (MS) of the multimode terminal, tuning the first part (MS) of the terminal to the frequencies indicated in the cell description read from the memory slot, and measuring the base station signals on the frequencies indicated in the cell description.

12. A multimode terminal which has been adapted to operate in a mobile communication system which consists of at least one first base station (BTS) and at least one second base station (RFP), wherein the said multimode terminal includes the equipment for storing the frequency data of at least one first base station (BTS) transmitted from the second base station (RFP), and the equipment for selecting the base station to which the multimode terminal listens on the basis of the stored frequency data.

* * * * *